Dec. 11, 1956   S. DOMESHEK   2,773,419
LOW OBLIQUE RECTIFYING AND RATIO CAMERA
Filed Aug. 6, 1953   3 Sheets-Sheet 1

INVENTOR
SOL DOMESHEK
BY R. J. Tompkins
ATTORNEYS

Dec. 11, 1956   S. DOMESHEK   2,773,419
LOW OBLIQUE RECTIFYING AND RATIO CAMERA
Filed Aug. 6, 1953   3 Sheets-Sheet 2

INVENTOR
SOL DOMESHEK

BY R. I. Tompkins
ATTORNEYS

Dec. 11, 1956     S. DOMESHEK     2,773,419
LOW OBLIQUE RECTIFYING AND RATIO CAMERA
Filed Aug. 6, 1953     3 Sheets-Sheet 3

INVENTOR
SOL DOMESHEK

BY R. I. Tompkins
ATTORNEYS

United States Patent Office 2,773,419
Patented Dec. 11, 1956

2,773,419

LOW OBLIQUE RECTIFYING AND RATIO CAMERA

Sol Domeshek, Great Neck, N. Y.

Application August 6, 1953, Serial No. 372,822

16 Claims. (Cl. 88—24)

(Granted under Title 35, U. S. Code (1952), sec. 266)

The invention described herein may be manufactured and used by or for the Government of the United States of America for governmental purposes without the payment of any royalties thereon or therefor.

The invention is designed to rectify views taken in the low-oblique range (0°–45° from the vertical) so that the final photograph or view will be equivalent to one taken with optical axis or line of sight in vertical position.

A primary object of the invention is to rectify photographs taken in the low-oblique range so that they will appear to have been taken with optical axis or line of sight vertical.

Another object of the invention is to simplify the structure required to accomplish rectification so that the total number of settings required for rectification are reduced to a minimum.

Yet another object of the invention is to provide a device that is adaptable for ratio rectification of various types of photographs.

A feature of the invention resides in the use of means to assure the conjugate object-to-lens and lens-to-image distances are accurately set for a wide range of tilt and magnification.

Another feature of the invention resides in the provision that the lens principal plane will intersect the intersections of the object and image planes throughout the range of operation of the rectifier.

Still another feature resides in the use of the isopoints of the negative and image as basic references.

And another feature of the invention resides in controlling the angular relation between the object and image planes and the distance betwen these planes at their isopoints under the entire range of rectification and magnification accomplished by the rectifier.

Other objects and many of the attendant advantages of this invention will be readily appreciated as the same becomes better understood by reference to the following detailed description when considered in connection with the accompanying drawings wherein.

When a photograph is taken with the camera axis other than perpendicular to the subject being photographed, the view obtained is an oblique view. To rectify these photographs, several methods are employed. A usual method requires individual settings for each of the component parts of the rectification orientation. This is not satisfactory since instruments requiring individual settings are bulky and complex in operation.

The invention to be described overcomes the inadequacies of older methods through the use of the isopoints as the primary reference and by the construction of basically new mechanisms for setting the structural elements and the necessary distances. In this manner, the photos are rectified from the low-oblique range to the equivalent normal to the datum plane of the scene.

The problem for the low oblique range is complicated since the imaginary line in which the three planes must intersect is often very remote from the optical system that is to do the work. The necessary intersection in this invention is accomplished by means of a stationary base and a vertical standard as fixed reference for the moving parts. The object and image planes are disposed to either side of the vertical standard, and means is provided to assure that they will maintain equal (but opposite) angles with the standard and lie at equal distances from it on their respective sides. The intersection of these planes is therefore in the plane of the standard. The principal plane of the lens is caused always to intersect the same line where the object and image planes intersect by means of the controlled lens yoke.

Figure 1:
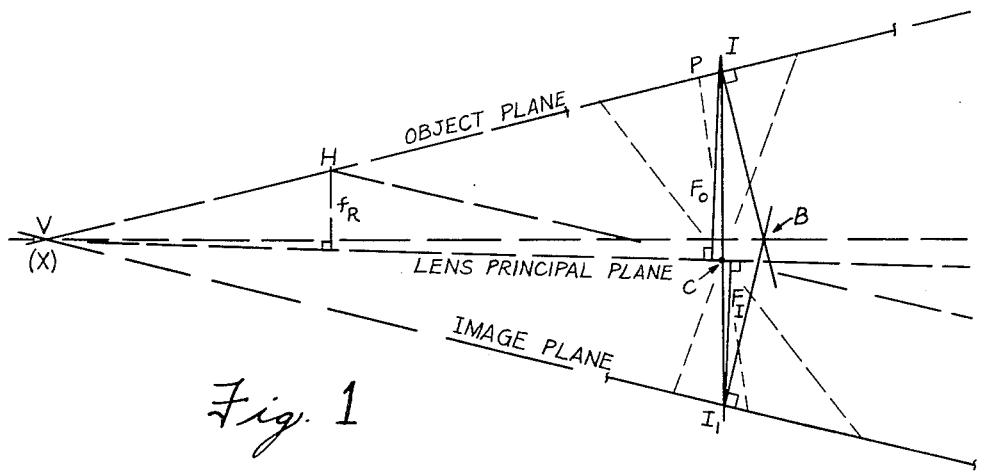
Fig. 1 is a diagrammatic illustration of the principle of the invention.
Figure 2:
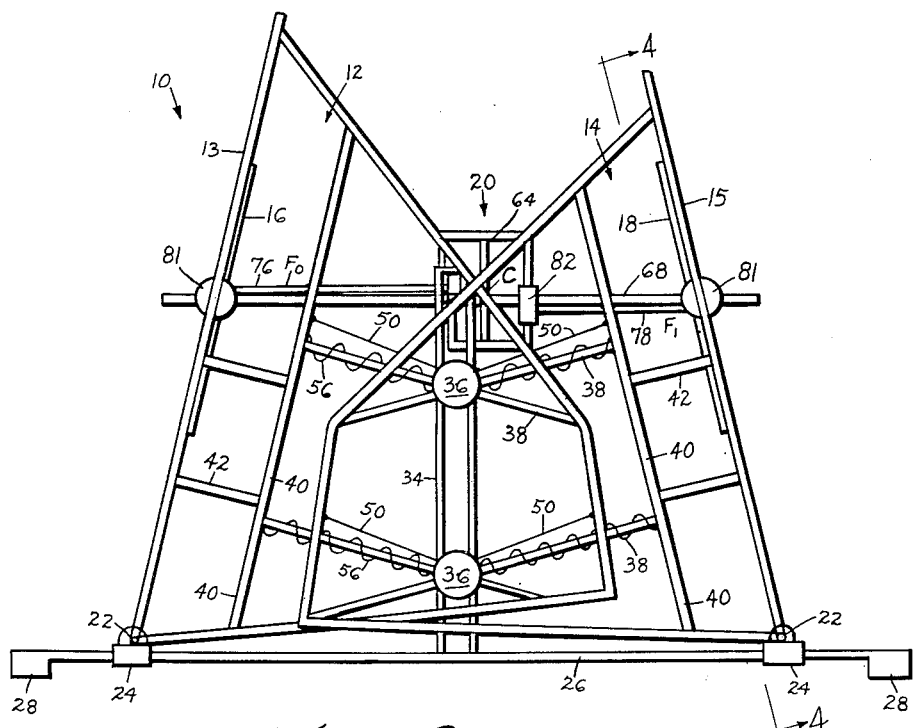
Fig. 2 is a side elevation of the structure of the invention.

Fig. 1 represents a schematic illustration of the invention. Photogrammetrically, in any photograph, the principal plane is the vertical plane containing the optical axis. The isoline is the intersection of the photograph plane with the plane of the equivalent vertical and the isopoint is the intersection of the isoline with the principal plane. When a photograph is taken of an object, such as a terrain, at an oblique angle rather than perpendicular to the base plane of the image, the photograph is an oblique perspective of the object or scene. This oblique perspective can be rectified simply and automatically as illustrated in the figure, wherein:

$fr$—focal length of the rectifier lens
$c$—position of rectifier lens
$H$—true horizon on the object plane
$I$—isopoint on the oblique negative
$I_1$—isopoint on the rectified photo
$P$—principal point on the oblique photo
$fc$—focal length of the camera lens
$T$—depression angle of camera axis
$m$—magnification To obtain sharp, precise rectification and ratio printing, it is necessary that:

1. The object plane, image plane and projection lens principal plane intersect in a common line,
2. The true horizon on the negative lie on the focal plane of the projection lens and be imaged at infinity (H must be at a distance from the axis of the projector lens),
3. The object to lens and lens to image distance relation for one other pair of conjugate points with respect to the projection lens be satisfied, and,
4. IH must equal CH to restore the correct perspective relations.

Conditions 1, 2 and 3 are well described in well known publications and literature dealing with optics, and no proof need be offered for their essentiality. The last named condition is derived from the geometry of the aerial photograph. The proof that this condition is met in the design of the invention is clearly seen in Figure 1 and is derived as follows:

*a.* Distances $IV$ and $I_1V$ resulting from the intersection of the object and image planes are equal, since by erecting $II_1$, $IBI_1$ becomes an isosceles triangle ($IB=BI_1$ by design) with angle $CIB$=angle $CI_1B$. It follows then that angle $VIC$=angle $VI_1C$, since each complements angles $CIB$ and $CI_1B$ respectively, and triangle $VII_1$ is isosceles.

b. By design, $F_0$ is perpendicular to the lens principal plane and equals $$\frac{(M+1)}{M}fr$$

and by definition $$\frac{IC}{CI_1}=\frac{1}{M}$$

further, by adjustment $IB=IV \tan CIB$ in which $IV=(f_c/\cos T)(M+1)$. But $f/\cos T=IH=CH$, from the geometry of the aerial photograph. Then, HC must be parallel to $VI_1$ and $$\frac{VH}{HI}=\frac{CI_1}{IC}=M$$

If now, a perpendicular is dropped from H to the lens principal plane, and if the intersection of this plane with the object plane is called (X), two right triangles are formed in which $$\frac{fr}{F_0}=\frac{XH}{XI}=\frac{M}{M+1}$$

But $$HI=\frac{VH}{M}$$

and $VI=VH+HI$ from which $$VI=VH+\frac{VH}{M}=VH\frac{(M+1)}{M}$$

Therefore, $$\frac{XH}{XI}=\frac{VH}{VI}$$

and since $X_1=XH+HI$, $HX=VH$ and $XI=VI$. Therefore, the lens principal plane intersects the object plane in the intersection of the object and image planes.

c. It also follows from the above development that H, the true horizon on the negative, lies in the focal plane of the projection lens and is imaged at infinity, since $fr$, the focal length of the projection lens, is the perpendicular distance of H from the lens principal plane, and HC is parallel to $VI_1$.

d. The object-image distance relation for one other pair of conjugate points with respect to the projection lens is satisfied since $F_0$ is set equal to $$\frac{M+1}{M}fr$$

and $F_1$ is set equal to $(M+1)fr$.

e. Finally, $IH=CH$ since IV is set equal to $VI_1$ by equating IB to $BI_1$ and from similar triangles, $$\frac{HT}{HC}=\frac{VI}{VI_1}$$

In constructing the device to carry out the principles of the invention, two perpendiculars are erected respectively at the isopoints of the object and image planes to intersect there. The perpendiculars are of equal length and are adjustable so that the length of each is equal to the focal length of the camera lens divided by the cosine of the angle between the camera axis and the horizontal and multiplied by the magnification desired plus one, with the entire quantity being multiplied by the tangent of one half the angle between the object and image planes, and the angle between the perpendiculars being equal to 180° minus the angle between the object and image planes. The intersecting mechanism is adjustable so that the lengths satisfy the lens distance equation for a given magnification. The lens used is adjustably positioned so that its node lies on a line with the isopoints of the object and image planes.

The details of the device of the invention are illustrated in Figures 2 to 6 with the rectifier designated at 10. Vertical frames 12 and 14 retain object and image plates 16 and 18 respectively. As is readily apparent from Figure 4, rectifier 10 comprises a pair of identical, spaced apart, frame members 12 and 14 mounting plates 16 and 18 therebetween. Secured between the spaced frame member is a lens yoke member 20, to be more fully described shortly (see Figures 1 and 3). Since the remainder of the structures for each frame member is duplicated, it will be understood that a description of one side of the device will apply to the other, parallel side.

Frame members 12 and 14 are pivotally mounted at 22 on roller bushings 24 which ride on base rail means 26. While any means to provide movement for the device is applicable, the use of ball bushings 24 is desired since play is minimized and the motion obtained is smooth and almost frictionless. Depending lugs 28 both support rail means 26 at a slight elevation to enable the members 12 and 14 of the rectifier to slide longitudinally and also provide stop means for the device. Standards 13 and 15 of frame members 12 and 14 are pivoted to bushings 24 and retain the object and image plates thereon. A slotted vertical guide 34 is fixed at its lower end to base rail 26 and is of U-shaped construction. Adjusting drums 36 are mounted between the arms of guide 34 and retain slidably adjusting rods 38. Brace means 40 and transverse brace means 42 provide rigidity to the frame members. Brace members 40 are parallel and spaced from the standards 16 and 18 with rods 38 terminating at one end on brace members 40. It will be noted that rods 38 are perpendicular to standards 13 and 15 and that the upper pair of rods 38, if extended beyond braces 40, would intersect the isoline (not shown) etched on object plate 16 and image plate 18.

Figure 6:
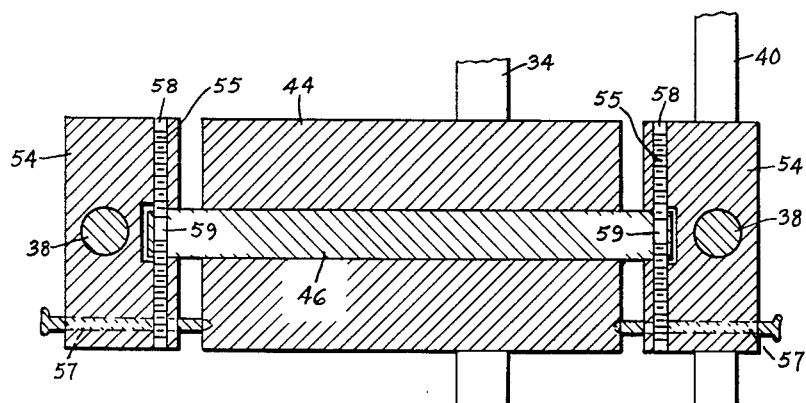
Fig. 6 is a detail section of the adjusting mechanism.
Figure 5:
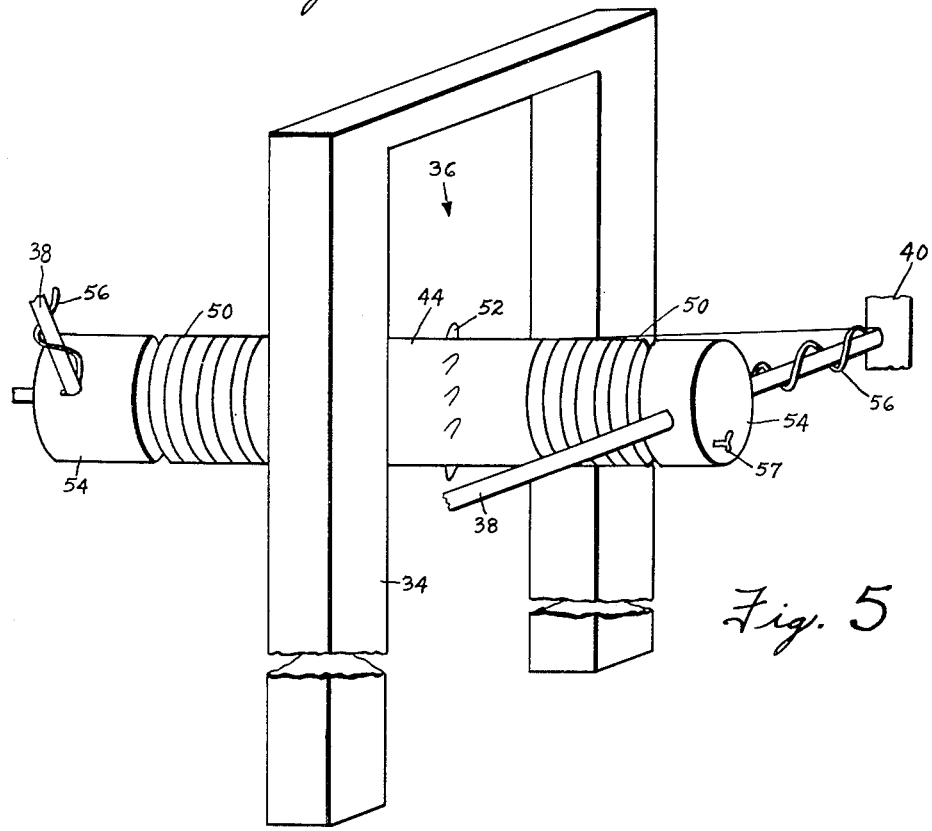
Fig. 5 is a perspective detail of the adjusting mechanism.

The structure to permit adjustment of rods 38 is clearly illustrated in Figures 5 and 6. Drum 44 is mounted on axle 46 and is rotated between vertical guide 34 by means of cable wires 50 used for winding and unwinding. Any suitable winding means, such as helm spokes 52 may be used. Axle 46 extends beyond the extremities of drum 44 and secures rod drums 54 thereon. Set screws 55 on drum 54 extend radially through passageways 58 in drums 54 and terminate in annular grooves 59 on shafts 46. Rod drums 54 thus are able to rotate freely on shaft 46 and independently of the rotation of drum 44. Expansion springs 56 are mounted on rods 38 between drums 54 and supports 40.

Drums 36 are retained in any position of adjustment. Rods 38 are fixed between supports 40 on the frame members and retain drum 36 thereon without requiring additional support. Opposing forces produced by cables 50 and tension means 56 assist in retaining the drum in adjusted position. Drum 36 is able to move vertically when the frame members are pivoted at 22 to vary the distance between intersecting point B and lens C (see Figure 1). Set screws 57 extend through drums 54 and seat against drum 44 to stop rotation of the rod drums when the adjusted position for the object and image plates is obtained.

Lens yoke assembly 20 is mounted between frames 12 and 14 and includes lens 60 fixedly held in position by means of spiders or straps 62 secured to vertical support rods 64 retained on the inner surface of rectangular yoke frame 66. Support rods on posts 64 contain the principal plane of the lens. Shafts 68 extend through support rods 64 through suitable apertures provided on the same plane as that of lens 60 and are slidably received in bearings 70 retained by supports 72 on standards 12 and 14 at the ends of the isolines on the image and object plates. In this manner, lens 60 is maintained in a line with shafts 68 and it is apparent that the node of lens 60 lies on the line joining the ends of the isolines. It will be noted that upper rods 38 are perpendicular to the isoline of the object and image plates, if extended. This construction is an important feature of the invention, for by referring all the settings for rectification to the isopoint, the number of computations and settings are reduced to a minimum.

Figure 3:
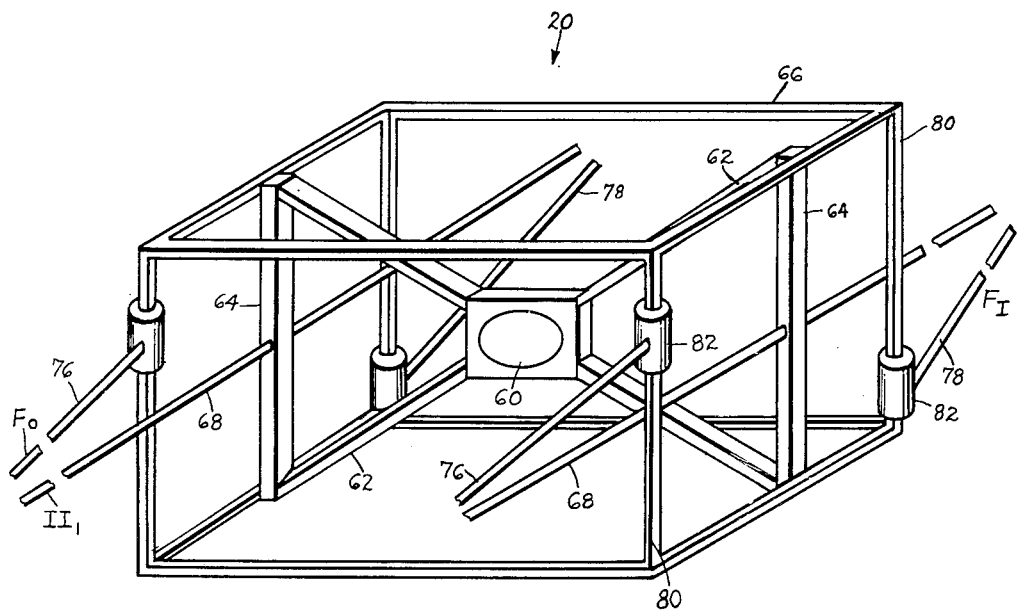
Fig. 3 is a perspective view of the lens yoke assembly.
Figure 4:
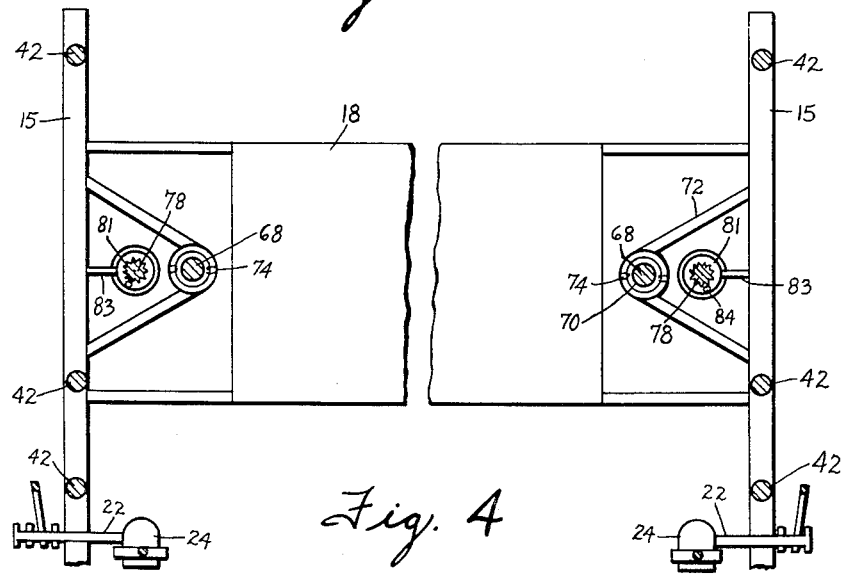
Fig. 4 is a vertical section taken on line 4—4 of Fig. 2.

Bearings 70 are rotatable on pivot pins 74 to allow shafts 68 to slide through as necessitated by adjustments of links 76 and 78. Adjustment for link 78 is illustrated in Figure 4, it being understood that link 76 is similarly constructed. The vertical supports 80 for rectangular lens frame 66 are equidistant from support rods 64 and are parallel to each other. Each support member 80 retains for slidable movement thereon sleeves 82 to which links 76 and 78 are perpendicularly secured. The link members are of equal length and are designed to be adjusted an equal distance. Since operation of rods 38 are in known relation to each other, a table may be prepared and the required adjustment both for rods 38 and links 76, 78 can be computed and supplied to the structure. Links 76 and 78 are threaded at a sharp pitch to permit the links to slide freely through internally threaded bearings 81 pivotally secured at 83 to standards 12 and 14. If the photograph were taken perpendicular to the object, no rectification would be necessary and links 76 and 78 would be on the same plane as shafts 68. However, when a photograph is taken at an oblique angle, if magnification is required, lens 60 must be tilted when the picture is rectified. This is carried out by rotation of links 76 and 78 by means of locking crank 84 to cause said links to travel through bearings 81. Adjustment of link 76 and 78, as illustrated in Figure 3 causes sleeves 82 to move in a vertical line, thereby tilting rectangular frame 66. When the principal plane of lens 60 intersects the intersection of the object and image plates, links 76 and 78 are locked in position by locking means (not shown) on crank 84.

The adjustment of the device for rectification and ratio printing of a given negative is carried out by mounting the negative on object plate 16 to face projection lens 60 so that the isoline and principal line of the negative coincide with the isoline and principal line etched on the object plate. Knowledge of the tilt and focal length is necessary to determine the isoline on the negatives, the isoline lying perpendicular to the principal line a distance $f_0 \tan \frac{1}{2}(90-T)$ from the principal point, and is readily calculated by well known means.

Lower drum assembly 36 is adjusted by manipulation of cables 50 causing arms 38 to slide frames 12 and 14 along rail 26 for an equal distance to or from each other. Drums 54 are rotated until angle IBI, as illustrated in Figure 1, is equal to 180°−2 angle CIB. Then upper arms 38, theoretically intersecting the ends of the lines of plates 16 and 18 at right angles, are adjusted by releasing or tightening cables 50 to change the distances of arms 38 to conform to the required setting. These distances are illustrated as $IB = BI_1$ on Figure 1 and are governed by the expression $IV \tan CIB$ where $IV = (f_0/\cos T)(M+1)$ and $$\text{angle } CIB = \frac{\text{angle } CVI + \text{angle } CVI_1}{2}$$

Obviously $$\sin CVI = \frac{fr \cos T}{Mfc}$$

and $$\sin CVI_1 = \frac{fr \cos T}{f_0}$$

These settings are dependent upon the tilt and focal length of the negative and are calculated and may be tabulated. Obviously the settings themselves may be made automatic, or semi-automatic, if desired. Arms 38 are equal in length and are connected to drum 44 so that their length may be increased or decreased simultaneously and equally. Necessary scales to read angle $IBI_1$, in terms of angle CIB, and to read distances IB and $BI_1$ are provided. Adjustment of arms 38 moves standards 13 and 15 horizontally and pivots said standards in a vertical plane to provide the angle formed by the object and image planes at the apex V. It will be noted that if standards 13 and 15 were extended vertically they would meet at V.

During this adjustment, shaft 68 slides in housing 70, as is true of link members 76 and 78 in housing 80, maintaining lens 60 in line with shaft 68.

$$\text{Link } 76 = \frac{(M+1)}{M} fr$$

and link $78 = (M+1)fr$. Rotation of housing 80 adjusts links 76 and 78 causing sleeves 82 to move in opposed directions and thereby tilting lens frame 66. Links 76 are designated at $F_0$ in Figure 2 and links 78 are designated at $F_1$ in Figure 2. The links are perpendicular to the lens principal plane and are adjusted so that their lengths satisfy the lens distance equation for a given magnification M. Lens 60 is maintained in this manner always in position so that the lens node lies on the line joining the two isopoints.

With a total of only four adjustments made for the rectifier (coupled from side to side), the negative on object plate 16 is illuminated (not shown) and the rectified image is produced on image plate 18 to produce a picture equivalent to one taken with the optical axis vertical.

Many advantages in this construction are readily apparent. The use of the isopoints of the negative and image as basic reference results in an integrated, compact, structural design. The rectifier construction assures the object to lens and the lens to image distances are accurately set for all conditions of rectification and magnification covered by the instrument and assures the lens principal plane will intersect the intersections of the object and image planes for the same range of conditions. The mechanism for controlling the angular relation between the object and image planes and the distance between these planes at their isopoints under all conditions of rectification and magnification is carried out by relatively simple controls ruggedly constructed and easily maintained. The simplicity of operation reduces the required number of settings for rectification. The device is adaptable for ratio rectification of 3 inch focal length 70 mm. photographs as well as 12 inch focal length 9 x 9 photographs.

Various other structures may be provided to carry out the principle of the invention. Instead of the operating arrangement shown being a side of the rectifier, it may be oriented to be the top of the rectifier with the mirror duplicate being the bottom. This would be advantageous for a larger instrument built to rectify larger and longer focal length photography and would require a modified structural, though not mechanical, arrangement. Also, the structures to ensure perpendicularity of arms 38 to object plate 16 and to image plate 18 may assume other configurations depending on the trusses used. Arms 38 may be screw constructed or of the rack type. Construction of link members 76 and 78 may also be similarly varied. Further, the upper ends of the lens yoke may be connected by spring means under tension to both the object and image plates, so that the springs always lie in a line parallel to the line joining the isopoints of the plates. This arrangement will aid particularly in facilitating adjustment of the angle of the lens principal plane with the isopoints of the plates so that it intersects the intersection of the object and image planes.

Obviously many modifications and variations of the present invention are possible in the light of the above teachings. It is therefore to be understood that within the scope of the appended claims the invention may be practiced otherwise than as specifically described.

What is claimed is:

1. The method of rectifying low oblique photographs comprising, intersecting an object plane and an image plane at a remote line, intersecting the principal plane of a projection lens at the same remote line providing angular and translatory movement between object and image planes relative to each other, and referencing all such movement through the isopoints of the object and image plates.

2. The method of claim 1 wherein the object plane has a true horizon and an isopoint, maintaining the projection lens at a distance from the horizon equal to the distance of the horizon to the isopoint, and adjusting the lens on the principal plane of the object plane so that the principal plane of the lens is at right angles thereto, whereby the original perspective relations for the photograph are transformed.

3. A rectifier for low oblique photographs comprising a base, an object plate and an image plate, means supporting said plates on said base, a lens carrier adapted to support a lents between said plates, means bisecting the angle between the object and image plates adjusting said plate supporting means so that the perpendicular distance from the object plate to the adjusting means on the base is equal to the distance from said adjusting means to the image plate, and adjusting means on said lens carrier orienting the carrier so that the principal plane of a lens adapted to be retained in said carrier and the planes of the object and image plates all intersect in a common line.

4. A rectifier for low oblique photographs comprising a base, an object plate and an image plate, means pivotally supporting said plates on said base, means to adjust said plates and a lens yoke between said object and image plates adapted to retain a lens whose plane intersects the intersection of the object and image planes said lens yoke comprising a frame, means in a line with the lens mounted on said frame and in said plate supporting means, and means to adjust said frame means so that the true horizon of a negative on the object plate lies in the focal plane of the lens.

5. The combination of claim 4 wherein the frame is rectangular, sleeve members retained on said frame, links secured at one end thereof to said sleeves and adjusting means on said plate supports receiving the other end of the links whereby the lens yoke may be adjusted so that the nodal point of a lens retained therein is maintained on the line joining the isocenters of the object and image plates.

6. The combination of claim 5 wherein the rectangular frame includes intermediate vertical posts, apertures in said posts on the principal plane of a lens and piercing the node thereof, and shafts extending through said apertures and said plate supports to maintain the lens principal plane in position.

7. A rectifier for oblique photographs comprising a base, standards slidably and pivotally retained on said base, an object plate and an image plate on said standards, guide means on said standards at the ends of the isolines of said object and image plates, a lens carrier adapted to retain a projection lens so that its principal plane and the planes of the object and image plates all intersect in a common line, and means secured to the carrier and extending through said guide means adapted to maintain the lens nodes on the line joining the isopoints of the object and image plates.

8. A low oblique photograph rectifier comprising a base rail, object and image plate supports retained on said rail, lens carrier means mounted between said supports, means secured to said plate supports and receiving said lens carrier means to adjust said carrier means and means secured to said rail to adjust said supports; said last named means including a guide mounted on said rail horizontally extended drums extending through said guide, rods extending slidably through said drums and secured to said supports and means coupled to said drum and supports rotating said drums to adjust said supports.

9. A low oblique photograph rectifier comprising a base rail, object and image plate supports retained on said rail, lens carrier means mounted between said supports, means secured to said plate supports and receiving said lens carrier means to adjust said carrier means, a winding drum, means secured to said rail mounting said winding drum, a rod drum rotatively coupled to said winding drum, a rod extending through said rod drum and secured on said supports, a cable wound on said winding drum whereby the rod may be adjusted, and stop means coacting between said rod drum and said winding drum to retain the rod in adjusted position.

10. A rectifier for oblique photographs comprising a base, standards slidably and pivotally retained on said base, an object plate and an image plate on said standards, guide means on said standards at the ends of the isolines of said object and image plates, a lens carrier adapted to retain a projection lens so that its principal plane and the planes of the object and image plates all intersect in a common point, means to adjust said carrier, slotted vertical guide members on said base, a winding drum between said vertical guide members, a shaft mounting said drum and extending beyond the extremities thereof, rod drums secured on said shaft extensions for independent rotation, rods extending through said rod drums and control means for said winding drum whereby the rods are moved to adjust the standards, said rods being perpendicular to the object and image plates at the ends of the isolines.

11. A rectifier for low oblique photographs comprising a base, opposed frames movably and pivotally carried on said base, an object plate and an image plate mounted on said frames, a lens yoke adjustably retained between said frames, adjustment means on said lens yoke and extending through the isopoints of the object and image plates, and fixed adjustment means bisecting the angle between the object and image plates, said adjusting means including shafts perpendicular to the object and image plates at their isopoints.

12. A rectifier for low oblique photographs comprising a base, opposed frames movably and pivotally carried on said base, an object plate and an image plate mounted on said frames, a lens yoke adjustably retained between said frames, adjustment means on said lens yoke and extending through the isopoints of the object and image plates, and fixed adjustment means bisecting the angle between the object and image plates, said adjusting means including shafts perpendicular to the object and image plates at the isopoints of said plates, said lens yoke comprising a rectangular frame, sleeve members slidably retained on said rectangular frame, and links extending from said sleeve members and through the isopoints of said object and image plates.

13. A rectifier for low oblique photographs comprising a base, opposed frames movably and pivotally carried on said base, an object plate and an image plate mounted on said frames, a lens yoke adjustably retained between said frames, adjustment means on said lens yoke and extending through the isopoints of the object and image plates, on said frame, a rectangular frame carrying lens mounting means, adjustment means on said rectangular frame extending through the isopoints on said object and image plates, slotted vertical guide means mounted on said base, a winding drum extending through said slotted guide means, truss means on said opposed frames and pivotally secured to said base, and adjustment rods extending from said truss means and through said drum in a line perpendicular to the object and image plates at the isopoints of said plates.

14. A rectifier for low oblique photographs comprising a base, opposed frames movably and pivotally carried on said base, an object plate and an image plate having isopoints mounted on said frames, a lens yoke adjustably retained between said frames, adjustment means on said lens yoke and extending through the isopoints of the object and image plates on said frame, a rectangular frame carrying lens mounting means mounted between said frames, adjustment means on said rectangular frame extending through the isopoints on said object and image plates, slotted vertical guide means mounted on said base, a winding drum extending through said slotted guide means, truss means secured on said opposed frames and pivotally secured to said base, and adjustment rods extending from said truss means and through said drum in a line perpendicular to the object and image plates at the isopoints of said plates, said drum including an axle extending beyond the extremities thereof, rod drums mounted on said axle and means coupling said rod drums to said first named drum for independent rotation of said rod and drums.

15. The combination of claim 14, wherein said coupling means comprises annular grooves on said shaft extremities, radial slots on said rod drums extending to said grooves and set screws extending through said slots and into said grooves.

16. The combination of claim 15, wherein said rectangular frame adjustment means includes link members slidably mounted on said frame and shaft means extending through said rectangular frame, said links and shafts extending through bearings mounted on said opposed frames.

References Cited in the file of this patent

UNITED STATES PATENTS

| | | |
|---|---|---|
| 1,126,353 | Becker | Jan. 26, 1915 |
| 1,528,021 | Janzer | Mar. 3, 1925 |
| 1,612,800 | Brock | Jan. 4, 1927 |
| 1,713,498 | Cooke | May 14, 1929 |
| 1,778,027 | Herriott | Oct. 14, 1930 |
| 1,853,072 | Morioka | Apr. 12, 1932 |
| 1,910,425 | Cahill | May 23, 1933 |
| 2,334,700 | Rogers | Nov. 30, 1943 |